US011422025B2

(12) United States Patent
Tan et al.

(10) Patent No.: US 11,422,025 B2
(45) Date of Patent: Aug. 23, 2022

(54) OPTICAL SENSOR CAPABLE OF SYNCHRONIZING TO AMBIENT LIGHT FLICKER

(71) Applicant: PixArt Imaging Inc., Hsin-Chu County (TW)

(72) Inventors: Zi-Hao Tan, Penang (MY); Joon-Chok Lee, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/124,332

(22) Filed: Dec. 16, 2020

(65) Prior Publication Data

US 2022/0187122 A1 Jun. 16, 2022

(51) Int. Cl.
*G01J 1/42* (2006.01)
*G01J 1/44* (2006.01)

(52) U.S. Cl.
CPC ............. *G01J 1/4204* (2013.01); *G01J 1/44* (2013.01); *G01J 2001/446* (2013.01)

(58) Field of Classification Search
CPC ...... G01J 1/4204; G01J 1/44; G01J 2001/446; G01J 1/34
See application file for complete search history.

(56) References Cited

U.S. PATENT DOCUMENTS

2019/0101442 A1* 4/2019 Mellot ................. G01J 1/4204
2020/0294468 A1* 9/2020 Hung ....................... G09G 5/10

* cited by examiner

*Primary Examiner* — Jennifer D Bennett
(74) *Attorney, Agent, or Firm* — Hauptman Ham, LLP

(57) ABSTRACT

There is provided an optical sensor including a photodiode, a wave converter, a pixel array and a processor. The photodiode detects ambient light flicker to generate sine waves. The wave converter converts the sine waves to square waves. The processor uses a sampling frequency to count the square waves, and identifies whether the ambient light flicker is well detected according to a counting value of each square wave and a counting value variation of multiple square waves within a count period to accordingly determine whether to adjust an acquiring phase of the image frame.

20 Claims, 3 Drawing Sheets

OPTICAL SENSOR CAPABLE OF SYNCHRONIZING TO AMBIENT LIGHT FLICKER

BACKGROUND

1. Field of the Disclosure

This disclosure generally relates to an optical sensor and, more particularly, to an optical sensor that synchronizes a frame rate of the optical sensor to a flicker frequency of ambient light to eliminate the influence of ambient light.

2. Description of the Related Art

The motion detector adopting an optical sensor identifies the object motion by calculating light intensity variation in image frames captured by the optical sensor. As indoor ambient light is sometimes provided by the fluorescent lamps that have flickers due to AC nature of the power system, when this kind of optical sensor is operated indoor, the average brightness of the image frames captured by the optical sensor can fluctuate between bright and dark if a frame rate of the optical sensor is not synchronized to a flicker frequency of ambient light such that incorrect motion may be identified. The flicker frequency of ambient light is determined according to an AC frequency of the power system.

For example referring to FIG. 1, it is a schematic diagram of acquiring image frames corresponding to ambient light fluctuation by a conventional optical sensor. When the optical sensor captures a first frame 1 while the ambient light fluctuates to its brightest intensity, the first frame 1 has the maximum average brightness; whereas when the optical sensor captures a second frame 2 while the ambient light fluctuates to its darkest intensity, the second frame 2 has the minimum average brightness; and the average brightness of the third frame 3 is between those of the first frame 1 and the second frame 2. The intensity fluctuation of frames 1 to 3 can lead to identifying an incorrect object motion.

Accordingly, the present disclosure further provides an optical sensor that synchronizes a frame rate of the optical sensor to a flicker frequency of ambient light when the ambient light flicker is well detected.

SUMMARY

The present disclosure provides an optical sensor that includes an individually operated photodiode for detecting flicker pulses of ambient light. The digital backend of the optical sensor identifies whether the fluctuation of ambient light is well detected or not according to the flicker pulses and a frame rate of image frames is adjusted only when a well detection is confirmed.

The present disclosure provides an optical sensor including a photodiode, a wave converter, a pixel array and a digital backend. The photodiode is configured to detect ambient light flicker to generate a sine wave signal. The wave converter is configured to convert the sine wave signal to a square wave signal. The pixel array is configured to acquire image frames according to frame ticks. The digital backend is configured to count the square wave signal using a sampling frequency, and generate a trigger tick for adjusting the frame ticks according to a counting value of every square wave signal within a count period as well as consistency of multiple counting values of all square wave signals within the count period.

The present disclosure further provides an optical sensor including a photodiode, a wave converter, a pixel array and a digital backend. The photodiode is configured to detect ambient light flicker to generate a sine wave signal. The wave converter is configured to convert the sine wave signal to a square wave signal. The pixel array is configured to acquire image frames according to frame ticks. The digital backend is configured to count a counting value of every square wave signal within a count period, synchronize the image frames to the ambient light flicker when identifying that the counting value of every square wave signal is within two predetermined thresholds as well as a difference value between a maximum counting value and a minimum counting value among multiple counting values of all square wave signals within the count period is within a predetermined range, and not synchronize the image frames to the ambient light flicker when identifying that not every square wave signal within the count period has the counting value within the two predetermined thresholds or the difference value between the maximum counting value and the minimum counting value among the multiple counting values exceeds the predetermined range.

The present disclosure further provides an optical sensor including a photodiode, a wave converter, a pixel array and a digital backend. The photodiode is configured to detect ambient light flicker to generate a sine wave signal. The wave converter is configured to convert the sine wave signal to a square wave signal having a square wave period. The pixel array is configured to acquire image frames using a frame period. The digital backend is configured to count a counting value of every square wave signal within a count period using a sampling frequency, adjust a phase of a secondly acquired image frame of a next count period behind the count period when the frame period is equal to the square wave period as well as a trigger tick is generated, and adjust a phase of a firstly acquired image frame of the next count period behind the count period when the frame period is multiple times of the square wave period as well as the trigger tick is generated.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The optical sensor of the present disclosure is adapted to be operated under fluctuating ambient light having a flicker frequency. When the ambient light flicker is well detected, the synchronization between image frames and the flicker frequency is performed to eliminate the incorrect motion identification. Meanwhile, to reduce the useless adjustment, when the ambient light flicker is not well detected, the synchronization mechanism is not executed. In the present disclosure, whether the ambient light flicker is well detected or not is identified according to stability of the period variation of ambient light detected within a predetermined time interval.

Figure 1:
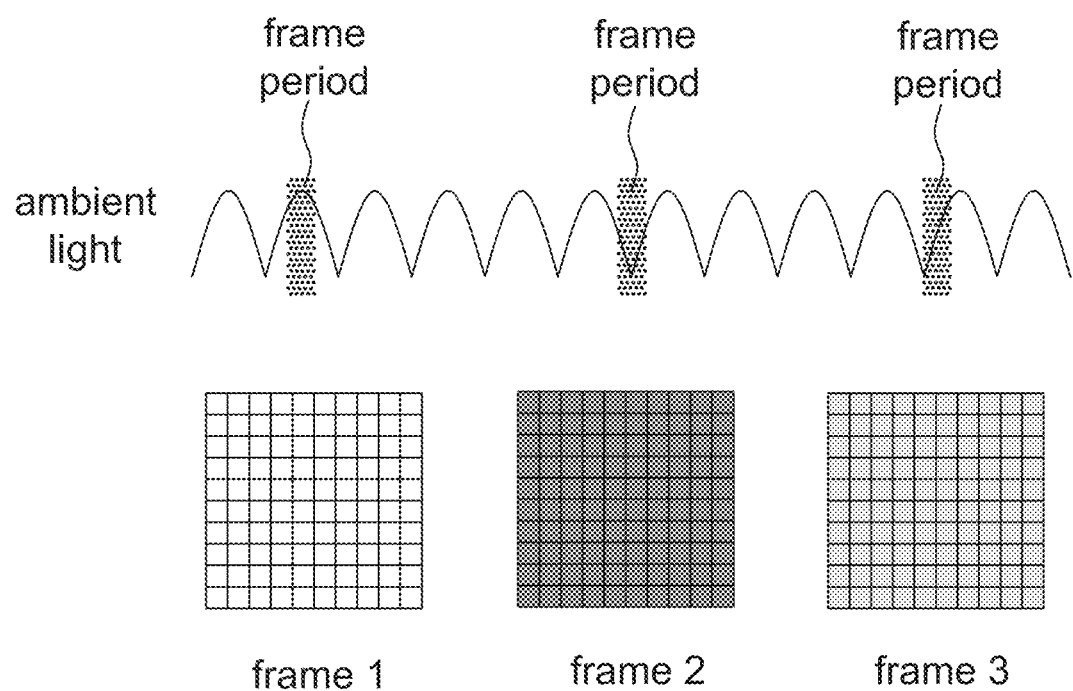
FIG. 1 is a schematic diagram of acquiring image frames corresponding to ambient light fluctuation by a conventional optical sensor.
Figure 2:
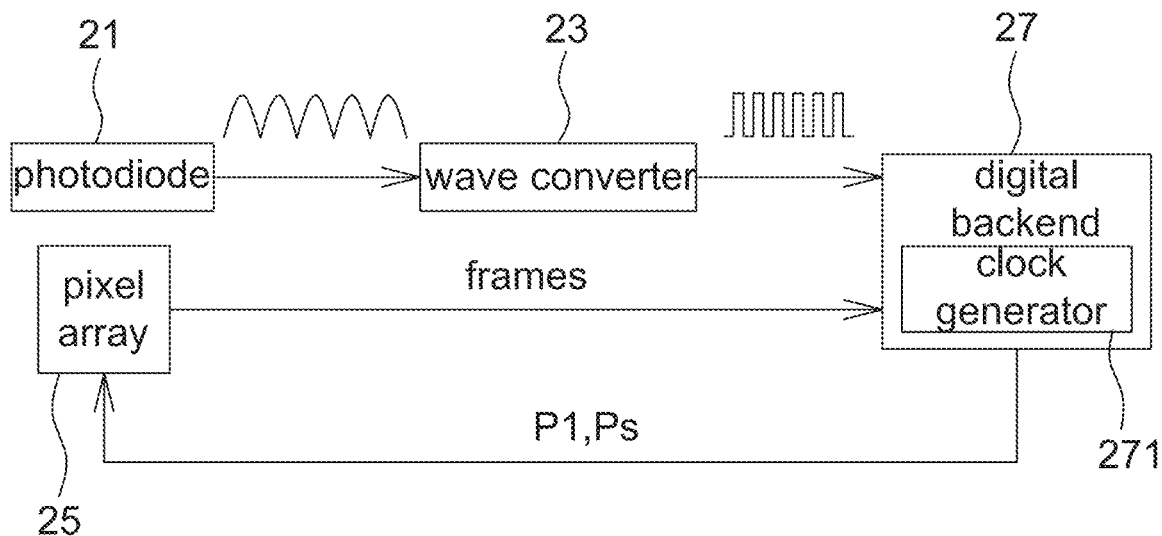
FIG. 2 is a schematic block diagram of an optical sensor according to one embodiment of the present disclosure.

Please referring to FIG. 2, it is a schematic block diagram of an optical sensor 200 according to one embodiment of the present disclosure. The optical sensor 200 is embedded in any camera or video camera suitable for the motion detection. The optical sensor 200 includes a photodiode 21, a wave converter 23, a pixel array 25 and a digital backend 27, wherein the digital backend 27 includes a clock generator 271 for generating clock signals having a clock frequency which is selected according to different applications, e.g., 64 KHZ, but the present disclosure is not limited thereto.

The photodiode 21 is used to detect ambient light flicker to generate and output sine wave signals. It is appreciated that when ambient light has no flicker, the photodiode 21 does not output the sine wave signal. In one aspect, the photodiode 21 is an independent component separated from the pixel array 25. In another aspect, the photodiode 21 is at least one pixel of the pixel array 25, e.g., at least one edge pixel of the pixel array 25, but not limited to the edge pixel. When the photodiode 12 is formed by multiple pixels, the output thereof is a summation or an average of raw data of the multiple pixels, and the summation or the average is calculated by the circuit of the pixel array 25.

Figure 3A:
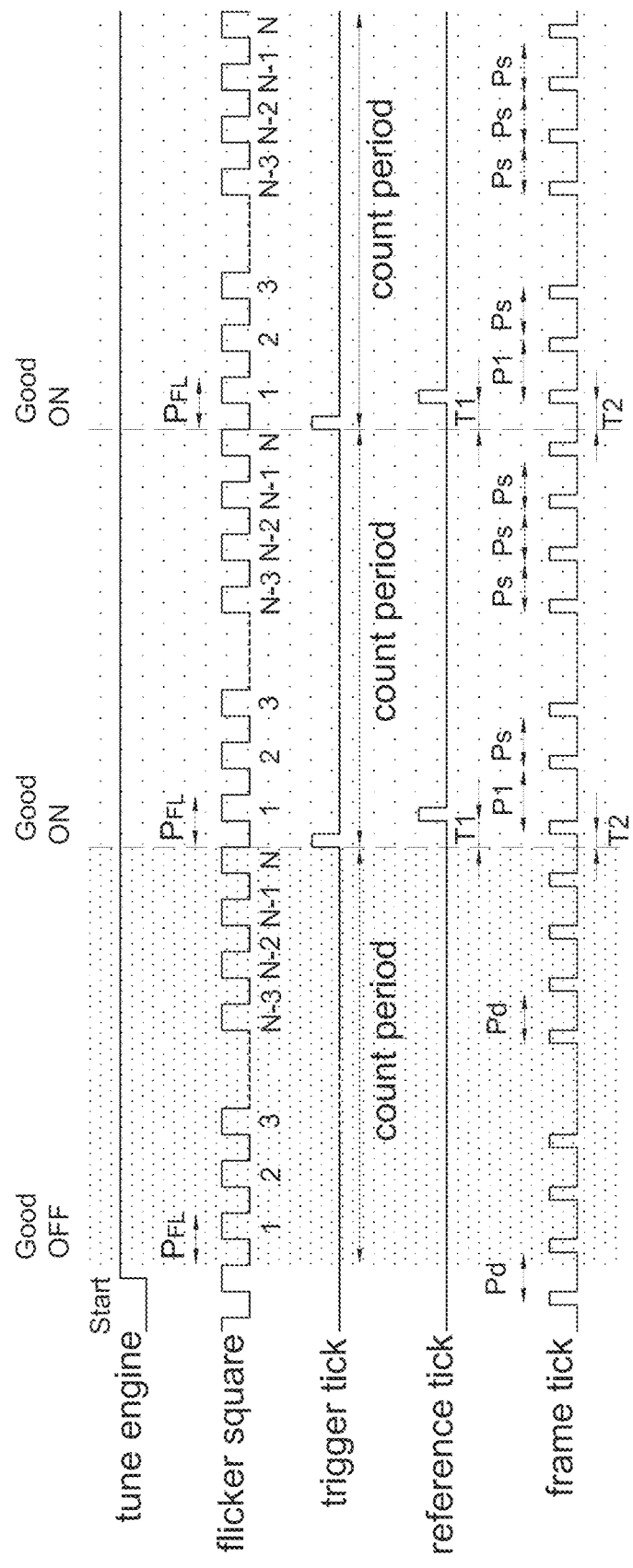
FIGS. 3A and 3B are operational schematic diagrams of an optical sensor according to some embodiments of the present disclosure.
Figure 3B:
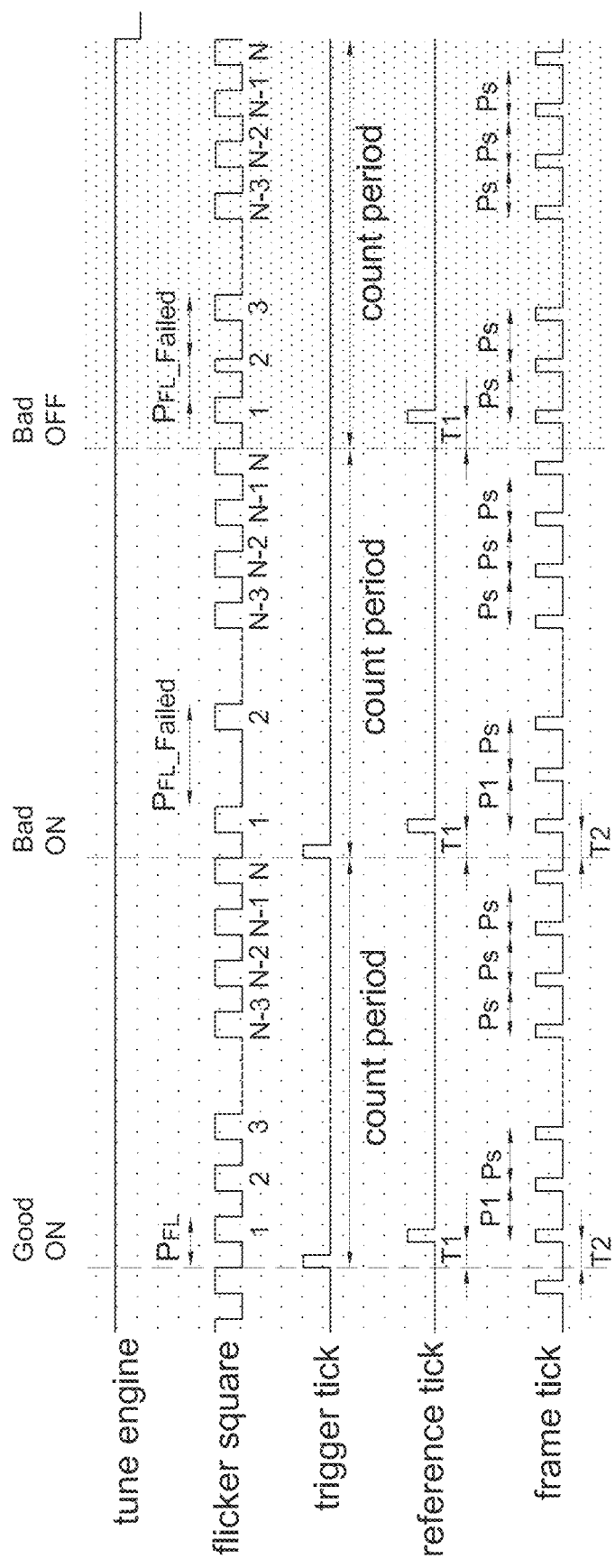

The wave converter 23 is electrically coupled to the photodiode 21, and used to convert the sine wave signals to square wave signals that have a square wave period $P_{FL}$, as shown in FIGS. 3A and 3B. When the photodiode 21 well detects light fluctuation of the fluorescent lamp, the square wave period $P_{FL}$ is equal to, for example, 1/100 second or 1/120 second. The wave converter 23 of the present disclosure adopts a conventional sine-to-square wave converter. For example, one commonly used technique for converting from a sine wave to a square wave is to apply the AC sine waves to a CMOS inverter or to one input of a comparator, but not limited thereto. In the present disclosure, the square wave signal is used to estimate whether the ambient light flicker is well detected or not within a count period, e.g., FIG. 3A showing good count periods, and FIG. 3B showing good and bad count periods.

The pixel array 25 is, for example, a pixel array of a CMOS image sensor, and includes multiple pixel circuits. The pixel array 25 is used to acquire image frames according to frame ticks, which are used to determine a frame period of acquiring image frames. For example, the pixel array 25 is arranged to acquire one image frame corresponding to each frame tick, or to acquire one image frame every multiple frame ticks (e.g., 10 frame ticks, but not limited thereto) according to different applications.

The digital backend 27 is, for example, a digital signal processor (DSP), a microcontroller unit (MCU) or an application specific integrated circuit (ASIC). The digital backend 27 counts square wave signals outputted from the wave converter 23 using a sampling frequency (e.g., generated by the clock generator 271), and generates a trigger tick for adjusting the frame ticks according to a counting value of every square wave signal within one count period and a consistency of multiple counting values of all square wave signals within the count period. In the present disclosure, one count period includes multiple square wave signals so as to evaluate whether the ambient light flicker is well detected or not with a predetermined time interval (e.g., the count period). For example, when one count period is arranged to include 100 (corresponding to 50 HZ AC power system) or 120 (corresponding to 60 HZ AC power system) square wave periods $P_{FL}$ of the square wave signal, the predetermined time interval is 1 second, but not limited thereto. The length of the square wave period is selected manually, e.g., by pressing a button or selecting from a human-machine interface, or measured according to a counting value of every square wave signal, e.g., the counting value between adjacent rising edges or falling edges of square pulses.

In the present disclosure, for illustration purposes, it is assumed the AC frequency of the power system is 50 HZ, the sampling frequency generated by the clock generator 271 is 64 KHZ, and the count period is arranged as 100 square wave periods, e.g., N shown in FIGS. 3A and 3B being equal to 100, but the present disclosure is not limited thereto. In other aspects, N is set as other values corresponding to a clock frequency of the clock generator 271 and an AC frequency of the power system.

Please referring to FIGS. 3A and 3B, they are operational schematic diagrams of an optical sensor 200 according to some embodiments of the present disclosure, wherein FIG. 3A shows the operation after the synchronization is started, e.g., a tune engine (e.g., implemented by hardware and/or firmware) of the digital backend 27 receiving a start operation signal (e.g., by pressing a button or executing an APP), which is shown by the signal level changing from a low level to a high level. After the synchronization is started, the photodiode 21 starts to output sine wave signals to the wave converter 23 to generate and output square wave signals to the digital backend 27. The digital backend 27 counts every square wave signal within a count period to obtain a counting value corresponding to the every square wave signal. However, whether the photodiode 21 outputs the sine wave signal before the synchronization is activated is not particularly limited herein.

FIG. 3B shows that poor square wave signals are detected, e.g., $P_{FL}$_Failed showing unstable square wave periods.

Firstly, the digital backend 27 identifies whether the ambient light flicker has good consistency or not within each count period to confirm whether to perform the frame rate adjustment.

When the digital backend 27 identifies that square weave signals in one count period (e.g., the first count period in FIG. 3A) have high consistency, a trigger tick is generated in a next count period (e.g., the second count period in FIG. 3A) to indicate that the phase of frame ticks is adjusted (i.e. adjusting the frame rate) in the next count period to cause the acquiring of image frames of the pixel array 25 to synchronize to the ambient light flicker. For example, FIG. 3A shows that the ambient light flicker is well detected in every count period, and a trigger tick is respectively generated in the second and third count periods.

In FIG. 3A, as there is no counting result previous to the first count period, the digital backend 27 does not generate any trigger tick and does not execute the synchronization procedure in the first count period, e.g., shown as OFF. More specifically, in the present disclosure the synchronization mechanism is not directed started when a signal level of the tune engine is changed.

When the digital backend 27 identifies that square wave signals within one count period have low consistency, a trigger tick is not generated in a next count period behind the one count period, and the image frames and the ambient light flicker are not synchronized in said next count period. For example, FIG. 3B shows that the ambient light flicker is not well detected in the second count period and thus a trigger tick is not generated in the third count period. In the present disclosure, a rising edge of the trigger tick is arranged to be in-phase with a falling edge of a last square wave signal of a previous count period. In addition to being used to control whether to perform the synchronization between the image frames and the ambient light flicker, the trigger tick is further used as a comparison basis for the reference tick and the frame ticks.

In the present disclosure, the digital backend 27 identifies the consistency of square wave signals based on two conditions. The first condition is that the digital backend 27 identifies whether a counting value of every square wave signal within one count period is within two predetermined thresholds or not. As mentioned above, when the digital backend 27 counts a 100 HZ square wave signal using 64 KHZ sampling signals, one square wave signal includes 640 counts in an ideal condition. In the present disclosure, the first threshold is arranged as, e.g., 64 KHZ/90 HZ=711; and the second threshold is arranged as, e.g., 64 KHZ/110 HZ=581. According to different sensitivity requirements, the first threshold and the second threshold are set higher or lower, and the above values are only intended to illustrate but not to limit the present disclosure.

The second condition is that the digital backend 27 identifies whether a difference value between a maximum counting value and a minimum counting value among all counting values (e.g., FIGS. 3A and 3B showing N=100) within one count period is within a predetermined range. For example, when the predetermined range is set as 1% of 640 counts, the predetermined range is 6 counts. Similarly, according to different sensitivity requirements, the predetermined range is set wider or smaller.

In the present disclosure, when the digital backend 27 identifies that the counting value of every square wave signal within one count period is within two predetermined thresholds (e.g., 581 and 711 mentioned above), and a difference value between a maximum counting value and a minimum counting value among all counting values in said one count period is within a predetermined range (e.g., 6 counts), it means that high consistency is confirmed and thus a trigger tick is generated in a next count period behind said one count period to synchronize the image frames and the ambient light flicker. In another aspect, when identifying only a predetermined number (e.g., 2, but not limited to) of square wave signals within said one count period having the counting value not within the two predetermined thresholds, the digital backend 27 still identifies that said one count period has high consistency.

In addition, when the digital backend 27 identifies that not every square wave signal (or more than the predetermined number) within one count period has the counting value within the two predetermined thresholds, or the difference value between the maximum counting value and the minimum counting value among all counting values in said one count period exceeds the predetermined range, it means that low consistency is confirmed and thus no trigger tick is generated in a next count period behind said one count period as well as the synchronization between the image frames and the ambient light flicker is not performed.

For example, the synchronization procedure is performed in the second and third count periods of FIG. 3A as well as the first and second count periods of FIG. 3B (e.g., shown as ON), but is not performed in the third count period of FIG. 3B (e.g., shown as OFF).

After the consistency of square wave signals is identified, the digital backend 27 performs the synchronization procedure.

The digital backend 27 further selects to generate a reference tick in every count period. FIGS. 3A and 3B show that a rising edge of the reference tick is in-phase with a rising edge of a first square wave signal in the same count period. When identifying that square wave signals of one count period have high consistency, the digital backend 27 calculates a time offset |T1−T2| between the reference tick and a first frame tick in the same count period (i.e. a next count period of said one count period) to adjust a first frame period P1 between a second frame tick of the next count period and the first frame tick according to the time offset |T1−T2|. More specifically, the time offset |T1−T2| indicates a time difference between the frame ticks and the square wave signals generated from ambient light flicker, and the digital backend 27 adjusts the acquiring phase of the pixel array 25 according to the time offset |T1−T2|, e.g., FIG. 3A showing that the acquiring phase of the second frame tick in the second count period is postponed to be synchronized to a second square wave signal, i.e., N=2.

In one aspect, the digital backend 27 calculates a first time difference T1 between the reference tick and the trigger tick in a next count period, calculates a second time difference T2 between a first frame tick and the trigger tick in the next count period, and calculates a difference value between the first time difference T1 and the second time different T2 as the time offset |T1−T2|. As shown in the second count period of FIG. 3A, P1=Ps+|T1−T2|, wherein Ps is a subsequent period of frame ticks behind the second frame tick of the next count period. The subsequent period Ps is shown to be equal to one square wave period of the square wave signal, e.g., one frame tick being generated every 640 oscillations of the sampling frequency.

More specifically, in the present disclosure the digital backend 27 adjusts a period between the first frame tick and the second frame tick, i.e. first period P1, in a next count period only when square wave signals in one count period (previous to said next count period) have high consistency, and the subsequent period Ps behind the second frame tick is arranged to be identical to the square wave period. In addition, when the square wave signals in one count period do not have high consistency, the first period P1 between the first frame tick and the second frame tick in the next frame period thereof is arranged to be identical to the subsequent period Ps, e.g., referring to the third count period in FIG. 3B.

As mentioned above, the pixel array 25 acquires one image frame corresponding to every frame tick or every multiple frame ticks. Accordingly, a frame period of the image frames acquired by the pixel array 25 is equal to a square wave period or multiple times of the square wave period of the square wave signals, wherein said multiple times is, for example, a positive integer larger than 1, but not limited to integers. As mentioned, as the digital backend 27 is to adjust a second frame tick in the next count period behind a counted period, the digital backend 27 adjusts an acquiring phase of a secondly acquired image frame (corresponding to the second frame tick) of the next count period when the frame period is arranged to be equal to the square wave period as well as the trigger tick is generated. However, when the frame period is arranged to be multiple times (e.g., 10 times) of the square wave period, the digital backend 27 adjusts an acquiring phase of a firstly acquired image frame (e.g., corresponding to the tenth frame tick) of the next count period. That is, when a pulse time of the second frame tick is adjusted, other pulse times there behind are also adjusted at the same time.

In one aspect, when a rising edge of the reference tick is in-phase with a rising edge of the first square wave signal in the same count period, the digital backend 27 does not generate the reference tick but directly uses the rising edge of the first square wave signal in the same count period as the reference tick. In other aspects, a reference tick is generated and arranged to opposite to other phases of the first square wave signal or opposite to other square wave signals in the same count period as long as the reference tick has a fixed phase relationship with the square phase signal in every count period.

The synchronization procedure of the present disclosure is testified as follows: (1) Operating the optical sensor 200 of the present disclosure under a light source (e.g., fluorescent lamp) having a fixed flicker frequency and examining whether a frame rate of the pixel array 25 is synchronizing to the fixed flicker frequency stably. (2) Blocking and unblocking the fluorescent lamp in turn to cause noises in the detection signal (e.g., the square wave signal mentioned above) and confirming whether the frame rate of the pixel array 25 is steady. As mentioned above, the synchronization procedure of the present disclosure is performed only when the ambient light flicker is well detected within a predetermined time interval, and thus if the frame rate still changes with existence of noises, it means that the synchronization procedure of the present disclosure is not performed normally. (3) Turning off the fluorescent lamp and confirming whether the frame rate of the pixel array 25 is maintained the same as that before the fluorescent lamp is turned off. As mentioned above, the frame rate of the pixel array 25 of the present disclosure maintains at the same frame rate after the fluorescent lamp is turned off, and thus if the frame rate changes after the fluorescent lamp is turned off, it means that the synchronization procedure of the present disclosure is not performed normally.

It is appreciated that if the sampling frequency is not changed but the flicker frequency of ambient light is changed, e.g., changing from 100 HZ to 120 HZ, the counting value of each $P_{FL}$ and a length of Ps are changed correspondingly. It is appreciated that all values mentioned herein are only intended to illustrate but not to limit the present disclosure.

As mentioned above, the conventional motion sensor can be influenced by ambient light flicker to have incorrect motion identification. Accordingly, the present disclosure further provides an optical sensor (e.g., FIG. 2) and an operating method thereof (FIGS. 3A-3B) that generates a trigger tick for calculating a phase of adjusting frame ticks only when the ambient light flicker is well detected so as to synchronize the image frames to the ambient light flicker.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensor, comprising:
a photodiode, configured to detect ambient light flicker to generate a sine wave signal;
a wave converter, configured to convert the sine wave signal to a square wave signal;
a pixel array, configured to acquire image frames according to frame ticks; and
a digital backend, configured to count the square wave signal using a sampling frequency, and generate a trigger tick for adjusting the frame ticks according to a counting value of every square wave signal within a count period as well as consistency of multiple counting values of all square wave signals within the count period.

2. The optical sensor as claimed in claim 1, wherein the photodiode is separated from the pixel array.

3. The optical sensor as claimed in claim 1, wherein the photodiode is at least one edge pixel of the pixel array.

4. The optical sensor as claimed in claim 1, wherein the count period includes 100 or 120 square wave periods of the square wave signal.

5. The optical sensor as claimed in claim 1, wherein
the all square wave signals are identified to have high consistency and the trigger tick is generated when the digital backend identifies that the counting value of every square wave signal is within two predetermined thresholds as well as a difference value between a maximum counting value and a minimum counting value among the multiple counting values is within a predetermined range, and
the all square wave signals are identified to have low consistency and the trigger tick is not generated when the digital backend identifies that not every square wave signal within the count period has the counting value within the two predetermined thresholds or the difference value between the maximum counting value and the minimum counting value among the multiple counting values exceeds the predetermined range.

6. The optical sensor as claimed in claim 1, wherein the digital backend is further configured to calculate a first time difference between a reference tick and the trigger tick,
calculate a second time difference between a first frame tick of a next count period behind the count period and the trigger tick, and
calculate a time offset between the first time difference and the second time difference to adjust a first period between a second frame tick of the next count period and the first frame tick according to the time offset.

7. The optical sensor as claimed in claim 6, wherein
a rising edge of the reference tick is in-phase with a rising edge of a first square wave signal of the next count period, and
a rising edge of the trigger tick is in-phase with a falling edge of a last square wave signal of the count period.

8. The optical sensor as claimed in claim 6, wherein a subsequent period of the frame ticks behind the second frame tick of the next count period is arranged as one square wave period of the square wave signal.

9. An optical sensor, comprising:
a photodiode, configured to detect ambient light flicker to generate a sine wave signal;
a wave converter, configured to convert the sine wave signal to a square wave signal;
a pixel array, configured to acquire image frames according to frame ticks; and
a digital backend, configured to
count a counting value of every square wave signal within a count period,
synchronize the image frames to the ambient light flicker when identifying that the counting value of every square wave signal is within two predetermined thresholds as well as a difference value between a maximum counting value and a minimum counting value among multiple counting values of all square wave signals within the count period is within a predetermined range, and
not synchronize the image frames to the ambient light flicker when identifying that not every square wave signal within the count period has the counting value within the two predetermined thresholds or the difference value between the maximum counting value and the minimum counting value among the multiple counting values exceeds the predetermined range.

10. The optical sensor as claimed in claim 9, wherein the photodiode is at least one edge pixel of the pixel array.

11. The optical sensor as claimed in claim 9, wherein the count period includes 100 or 120 square wave periods of the square wave signal.

12. The optical sensor as claimed in claim 9, wherein the digital backend is further configured to generate a trigger tick for controlling whether to synchronize the image frames to the ambient light flicker.

13. The optical sensor as claimed in claim 12, wherein the digital backend is further configured to calculate a time offset between a reference tick and a first frame tick of a next count period behind the count period to adjust a first period between a second frame tick of the next count period and the first frame tick according to the time offset.

14. The optical sensor as claimed in claim 13, wherein
a rising edge of the reference tick is in-phase with a rising edge of a first square wave signal of the next count period, and
a rising edge of the trigger tick is in-phase with a falling edge of a last square wave signal of the count period.

15. The optical sensor as claimed in claim 13, wherein a subsequent period of the frame ticks behind the second frame tick of the next count period is arranged as one square wave period of the square wave signal.

16. An optical sensor, comprising:
a photodiode, configured to detect ambient light flicker to generate a sine wave signal;
a wave converter, configured to convert the sine wave signal to a square wave signal having a square wave period;
a pixel array, configured to acquire image frames using a frame period; and
a digital backend, configured to
count a counting value of every square wave signal within a count period using a sampling frequency,
adjust a phase of a secondly acquired image frame of a next count period behind the count period when the frame period is equal to the square wave period as well as a trigger tick is generated, and
adjust a phase of a firstly acquired image frame of the next count period behind the count period when the frame period is multiple times of the square wave period as well as the trigger tick is generated.

17. The optical sensor as claimed in claim 16, wherein the trigger tick is generated when the digital backend identifies that the counting value of every square wave signal is within two predetermined thresholds as well as a difference value between a maximum counting value and a minimum counting value among multiple counting values of all square wave signals within the count period is within a predetermined range.

18. The optical sensor as claimed in claim 16, wherein the digital backend is further configured to generate frame ticks for determining the frame period,
control the pixel array to acquire one image frame corresponding to each frame tick when the frame period is equal to the square wave period,
control the pixel array to acquire one image frame every multiple, equal to the multiple times, frame ticks when the frame period is the multiple times of the square wave period, and
calculate a time offset between a reference tick and a first frame tick of a next count period behind the count period to adjust a first period between a second frame tick of the next count period and the first frame tick according to the time offset.

19. The optical sensor as claimed in claim 18, wherein
a rising edge of the reference tick is in-phase with a rising edge of a first square wave signal of the next count period, and
a rising edge of the trigger tick is in-phase with a falling edge of a last square wave signal of the count period.

20. The optical sensor as claimed in claim 18, wherein a subsequent period of the frame ticks behind the second frame tick of the next count period is arranged as one square wave period of the square wave signal.

* * * * *